H. A. Norris.
Tapping Mains.
No. 45.
Reissued Aug. 11, 1842.
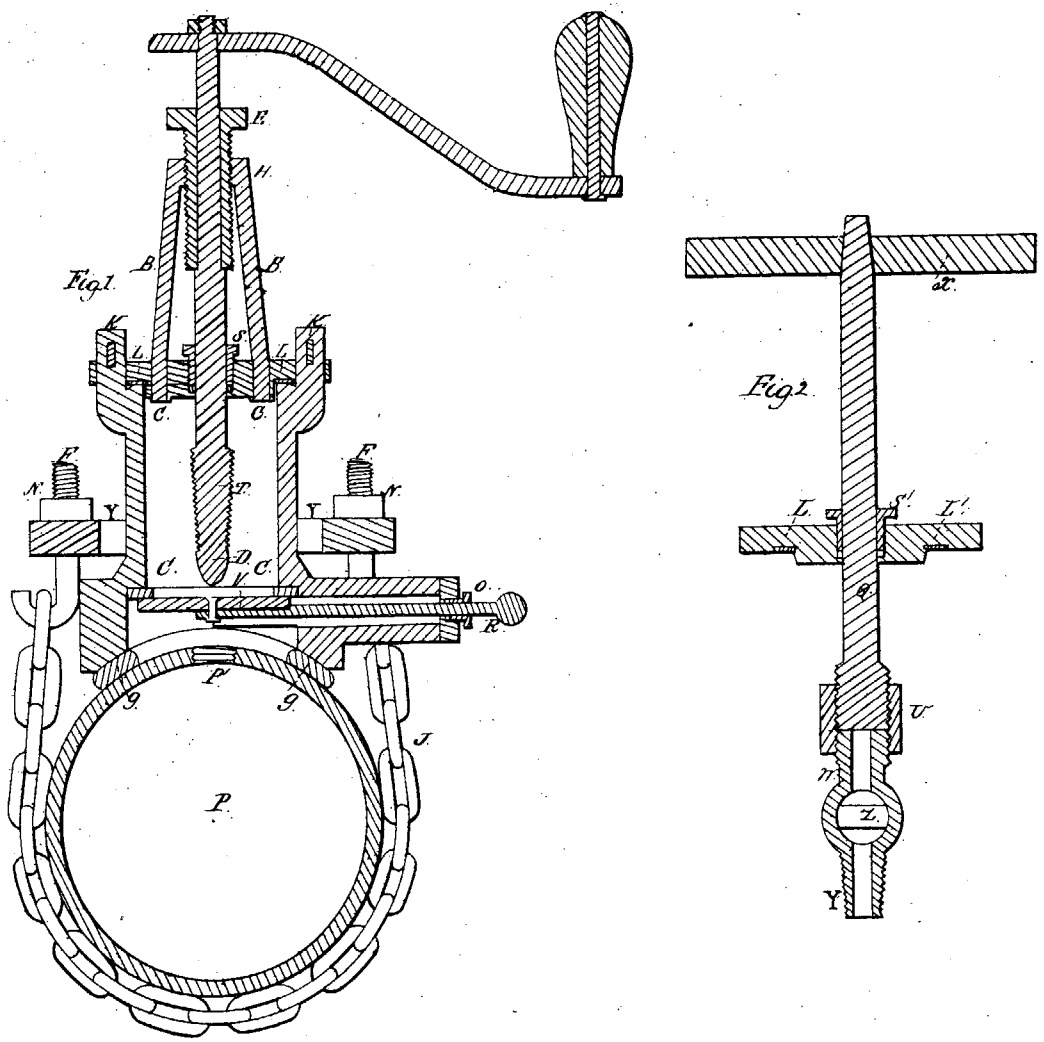
THE GRAPHIC CO. PHOTO-LITH. 39 & 41 PARK PLACE, N.Y.

UNITED STATES PATENT OFFICE.

H. ARIEL NORRIS, OF NEW YORK, N. Y.

MACHINE FOR BORING AND TAPPING WATER AND OTHER PIPES WHILE UNDER HYDROSTATIC PRESSURE.

Specification forming part of Letters Patent No. 2,681, dated June 22, 1842; Reissue No. 45, dated August 11, 1842.

*To all whom it may concern:*

Be it known that I, H. ARIEL NORRIS, of the city and county of New York, have invented a new and useful Machine for Boring, Tapping, and Reaming Water or other Pipes while under Hydrostatic Pressure, and for attaching thereto lateral or service pipes; and I do hereby declare that the following is a full and accurate description of the construction and operation of the same, reference being had to the annexed drawings, making part of this specification, in which—

Figure 1 is a vertical section of the machine attached to a pipe for boring, and Fig. 2 is a shaft for inserting the ferulet, cock, or other tube to which the lateral pipe is to be attached.

In order to bore the pipe P a circular cushion, *g g*, is made to surround the spot to be drilled. The curved bottom of the machine is then laid over the cushion and the machine strongly pressed against the pipe by the chain J or other band, passing around the pipe and drawn tight by turning the nuts N N of the screw-bolts F F, let into the yoke Y Y, surrounding the machine. The lower valve, V, is now opened, which uncovers the pipe to the action of the drill, the point of which, D, is brought down to the pipe by a screw, E, working into the cross-head H of the braces B B, let into the lid L L of the machine. As soon as the drill has perforated the pipe the water rushes through the opening P′ and fills the chamber C C C C of the machine, but cannot pass beyond, for the lid L L is accurately fitted to the top of the chamber, and is confined in its place by the keys K K, or by screws or wedges properly arranged. Stuffing-boxes at S and O prevent the escape of water around the drill-shaft and rod for working the valve, and the cushion prevents the escape of water between the pipe and the machine. Above the point of the drill is a tap, T, with which a screw-thread is cut in the hole drilled to correspond with the thread cut upon the bottom of the ferulet. When it is not deemed advisable to use a screw, the ferulet is left smooth at bottom, and the top is replaced by a plain reamer. The drill is now raised to allow the valve to be closed, which being done the keys are taken out, the lid with its attached drill removed, and a similar lid, L′ L′, Fig. 2, put in its place. This lid is provided with a stuffing-box, S′, forming a guide for the ferulet-shaft Q, the ferulet being attached to it by a socket in which both are screwed. When this lid is in its place, by turning the cross-head X of the shaft the lower end, Y, of the ferulet is screwed into the tapped opening P′ of the pipe, care being taken to turn the spiggot Z of the ferulet, so as to allow no escape of water. The shaft Q may now be detached from the ferulet, the chain slackened, and the machine removed.

A screw or other joint may now be made at leisure, and the lateral pipe thus attached to the ferulet.

The form and size of the chamber may evidently be varied.

The purposes accomplished by the machine above described could also be attained by a chamber revolving upon the base or bed of the machine. The drill and ferulet shafts occupying different positions at the commencement, they could be brought successively over the same spot, and the hole be bored and the ferulet inserted successively without the intervention of a valve. This form, the first invented by me, was laid aside for the one described in detail above; but the claims hereinafter made are intended to comprise both.

It may be observed that tightness, though convenient for many reasons, is not indispensable to the action of the machine. Indeed it has been found convenient sometimes to allow an escape of water in order to carry the borings or chips of iron out of the machine.

What I claim as my invention, and desire to secure by Letters Patent, is—

1. The boring, tapping, reaming, and making conducting attachments to water or other pipes while under hydrostatic pressure by means of a close chamber, within which the drill, tap, reamer, and ferulet are operated according to the principles herein set forth, and by which the workman is protected during the work from the flow of water or other fluid from the pipes.

2. The combination of the valve for stopping the flow of water with the drill, tap, reamer, or ferulet stock, or any one of them, or any analogous contrivance, substantially as herein described, and this I claim with or without reference to the chamber and lid.

3. The valve in combination with the lid and chamber, so that when the valve is open for the operation of the drill, tap, reamer, or ferulet the water will be prevented from escaping or annoying the workman by the chamber and lid, and when the valve is closed the lid, drill, &c., may be removed, as described.

H. ARIEL NORRIS.

Witnesses:
W. P. N. FITZ GERALD,
CHS. M. KELLER.